US006673848B2

(12) United States Patent
Bon

(10) Patent No.: US 6,673,848 B2
(45) Date of Patent: Jan. 6, 2004

(54) PROCESS FOR MANUFACTURING A TIRE SAFETY SUPPORT AND SUPPORT OBTAINED BY THIS PROCESS

(75) Inventor: Bernard Bon, Yssac-la-Tourette (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 29 days.

(21) Appl. No.: 09/842,523

(22) Filed: Apr. 25, 2001

(65) Prior Publication Data

US 2001/0054776 A1 Dec. 27, 2001

(30) Foreign Application Priority Data

Apr. 25, 2000 (FR) .............................. 00 05346

(51) Int. Cl.⁷ .............................. C08G 18/10
(52) U.S. Cl. ...................... 521/148; 264/45.1; 521/155; 521/170
(58) Field of Search ................. 264/45.1; 521/148, 521/155, 170

(56) References Cited

FOREIGN PATENT DOCUMENTS

| GB | 2013143 | 8/1979 |
| JP | 59075912 | 4/1984 |
| JP | 6183226 | 7/1994 |

OTHER PUBLICATIONS

Brunauer et al., *Journal of the American Chemical Society*, vol. 60, pp. 309–319 (Feb., 1938).

Primary Examiner—John M. Cooney, Jr.
(74) Attorney, Agent, or Firm—Baker Botts L.L.P.

(57) ABSTRACT

The present invention provides a process for manufacturing a cross-linked expanded safety support having a cellular structure comprising closed cells. The process involves kneading by thermomechanical working a rubber composition comprising a diene elastomer having a molar ratio of diene units (defined as units resulting from dienes) of less than 15%, water in an amount of from 3 to 6 phr (phr=parts by weight per 100 parts elastomer), a blowing agent, such as azobisformamide, that provides for formation of the cellular structure and a vulcanization system. The rubber composition so prepared is then formed, e.g. by injection or extrusion, into cross-linkable blank, which is then cured in a mold and then demolded. The demolded blank is then expanded by decomposition of the blowing agent and vulcanized to produce the cross-linked expanded elastomeric support.

7 Claims, 1 Drawing Sheet

PROCESS FOR MANUFACTURING A TIRE SAFETY SUPPORT AND SUPPORT OBTAINED BY THIS PROCESS

BACKGROUND OF THE INVENTION

The present invention relates to a process for manufacturing a cross-linked, expanded elastomeric safety support having a cellular structure comprising closed cells. The support is intended to be mounted on a wheel rim within a tire. The invention also relates to a cross-linkable, expandable blank intended to constitute the safety support in the cross-linked, expanded state. The invention is also directed to the support itself, and to a process for reducing internal heating during travel of this support mounted on a wheel rim following a drop in tire pressure. This safety support can be fitted on tires of two or four wheel vehicles, e.g. motorcycles or cars.

Elastomeric safety supports having closed cells ("cellular supports") for competition tires which are intended to travel on bumpy courses, such as cross-country rallies, are well known. Such cellular supports permit travel at zero or very low tire pressure by ensuring tire function following perforation of the tire over a distance correlating with the severity of the course conditions.

The cellular supports used for motorcycles are usually toric in shape. Prior to being mounted on a wheel rim, they have a volume slightly greater than that of the interior space of the tire, so that they may occupy all the interior space of the corresponding tires in order to support them at zero pressure.

Such supports are generally prepared by extruding a cross-linkable, expandable rubber composition which has been subjected to thermomechanical working, then vulcanizing and expanding the extruded composition in order to obtain a cross-linked, expanded support resulting from thermal decomposition of a blowing agent which is initially present in the rubber composition.

Under severe conditions of travel at zero tire pressure, the heating of the support results in an increase in the permeability of the walls of the cells allowing the gradual escape of part of the gas contained in the support. As a result, the volume of the support decreases, such that it no longer effectively ensures function of the tire after a certain amount of time has elapsed.

This internal heating can also completely damage the support after a certain amount of time has elapsed. It is then no longer possible to drive the vehicle.

Cellular supports used for automobiles are not supposed to occupy all the interior space of a tire, except when traveling with a flat tire following a drop in pressure, because they are compressed by the inflation air of the tire when traveling at normal pressure. The same disadvantages due to the internal heating of the automobile tire support may occur following a drop in tire pressure.

Attempts have been made in the past to ensure that a cellular support for a motor vehicle can sufficiently dilate inside a tire following a drop in pressure, so as to bear effectively on the tire when traveling with a flat tire. To this end, it has been proposed to provide this support with a fluid that is vaporizable at atmospheric pressure at a temperature of between 29° C. and 135° C., preferably between 50° C. and 90° C. Reference may be made to British Patent Specification GB-A-2 013 143 for the description of such a specific support for an automobile.

The rubber composition used for the support of GB '143 is preferably based on polyethylene foam. These compositions may also be based on a polypropylene or polyurethane foam, on a blend of nitrile rubber and polyvinyl chloride, or alternatively on 1,2-polybutadiene.

The fluid used is supposed to permit expansion of the support when traveling with a flat tire when it vaporizes because of the increase in temperature within the tire. This fluid may be ethylene oxide, methyl chloride, "Freon", mono-alcohols, di-alcohols or water.

It will be noted that this support is not supposed to have minimized internal heating when traveling with a flat tire.

SUMMARY OF INVENTION

The inventor has surprisingly discovered that the association of water, in an amount of from 3 to 6 phr (parts by weight per 100 parts elastomer), with a diene elastomer having a molar ratio of diene units of less than 15% allows the production of a cross-linked expanded elastomeric support having a cellular structure comprising closed cells that can be mounted on a wheel rim within a tire which, during travel, does not deteriorate and lose volume as a result of excessive internal heating. A diene elastomer having a molar ratio of "diene units" of less than 15% is intended to mean a diene elastomer having a molar ratio of "units resulting from dienes" of less than 15%.

Thus, the present invention is directed to a process for obtaining an improved elastomeric safety support for mounting on a wheel rim within a tire. The process comprises kneading by thermomechanical working a rubber composition comprising a diene elastomer having a molar ratio of diene units of less than 15%, water in an amount of 3 to 6 phr, a blowing agent and a vulcanization system, forming the rubber composition into a cross-linkable, expandable support blank of predetermined section, curing the blank in a mold, demolding the blank, and expanding via decomposition of the blowing agent and vulcanizing the cured demolded blank to obtain a cross-linked expanded cellular support. The forming step may be carried out, for example by injection or extrusion.

Advantageously, the rubber composition comprises a reinforcing filler comprising silica in an amount of from 10 to 30 phr and carbon black. The diene elastomer is, preferably, a copolymer of isobutylene and a co-monomer selected from between isoprene and paramethystyrene.

BRIEF DESCRIPTION OF THE DRAWING

The invention will be better understood with reference to the detailed description and examples below and by reference to the appended drawing in which.

DETAILED DESCRIPTION OF THE INVENTION

Figure 1:
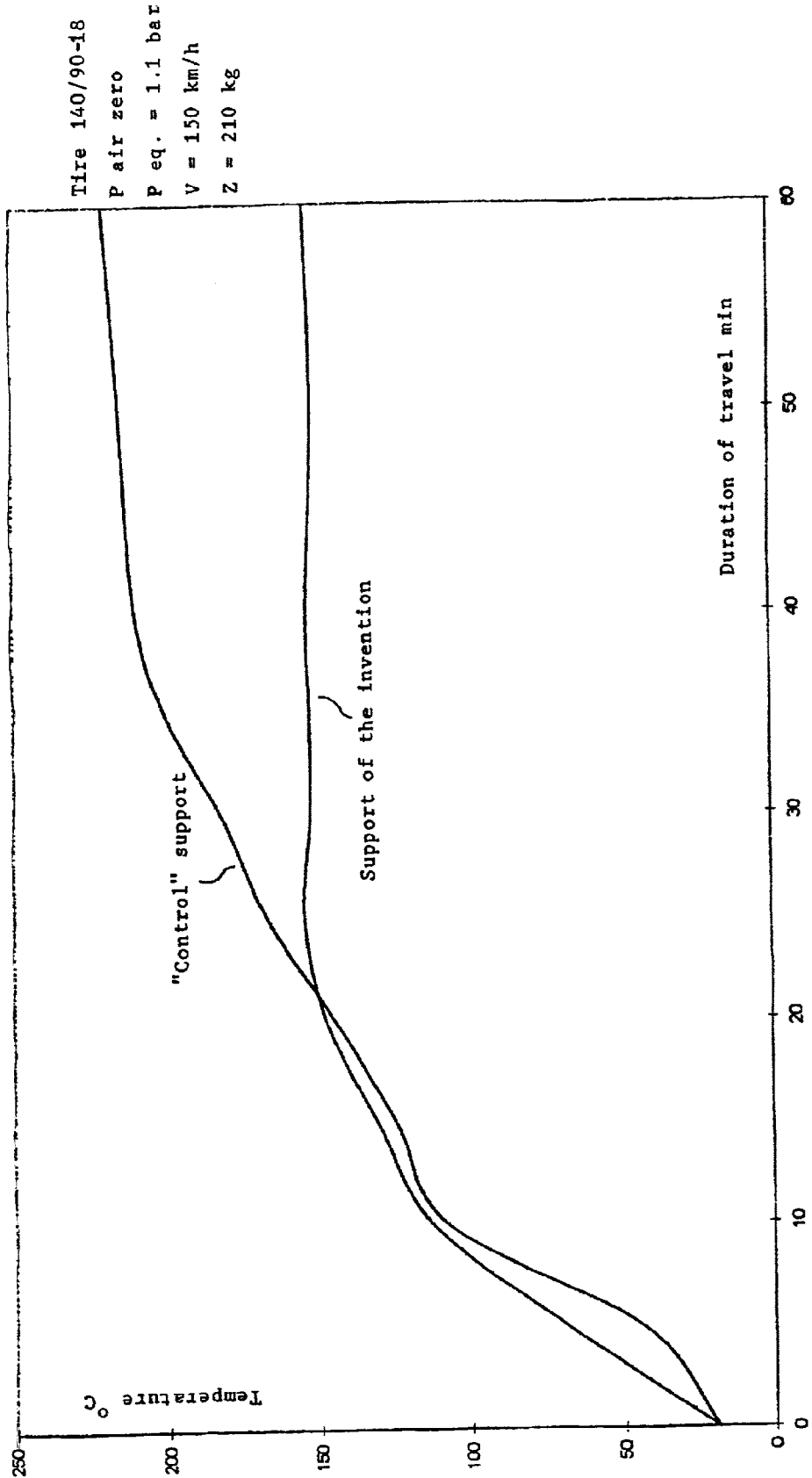
FIG. 1 is a graph illustrating internal heating of a support according to the invention when traveling at zero pressure compared to a control support.

In accordance with the invention, "diene" elastomer means, in known manner, an elastomer (homopolymer or copolymer) formed at least in part from diene monomers (monomers bearing two double carbon—carbon bonds, whether conjugated or not).

Preferred diene elastomers are those having a molar ratio of diene units which is less than 15% (commonly referred to as "essentially saturated" diene elastomers). What is meant by a diene elastomer "having a molar ratio of diene units" is a diene elastomer "having a molar ratio of units resulting from dienes". Examples of preferred diene elastomers include copolymers of isobutylene and another co-monomer, such as isoprene (butyl or "IIR" rubbers), or paramethylstyrene ("EMDX" elastomers, such as the one sold under the name "EXXPRO"), that have reduced permeability to air. Halogenated versions of the isobutylene and isoprene copolymers, in particular the chlorinated or brominated versions ("BIIR" or "CIIR" rubbers, bromobutyl and chlorobutyl rubbers, respectively), can also be used.

The blowing agent used in the kneading step, preferably azobisformamide, is added to the diene elastomer and to the other constituents of the rubber composition in a quantity of from 15 phr to 30 phr.

The rubber composition also comprises a reinforcing filler comprising carbon black and from 10 phr to 30 phr silica, preferably from 15 phr to 25 phr, for implementing said first step.

It has been shown that cross-linkable blanks prepared from a rubber composition that does not comprise silica, but only contains carbon black as reinforcing filler, are the seat of significant, rapid decomposition of the blowing agent during preliminary curing, because of the presence of water in the blank. The decomposition of the blowing agent results in premature expansion of the blank during the preliminary curing step, which makes it difficult to remove the pre-cured blank from the mold without damaging it. The presence of silica in the rubber composition forming the blank prevents this undesirable decomposition of the blowing agent during preliminary curing and, consequently, permits demolding under satisfactory conditions.

The silica added to the rubber composition during the kneading step may advantageously be hydrated, such that the water supplied by the silica is associated with the elastomer in the aforementioned quantity of from 3 to 6 phr.

The silica which may be used to manufacture the support of the invention may be any reinforcing silica known to the person skilled in the art, in particular, any precipitated or pyrogenic silica having a BET surface area and a specific CTAB surface area both of which are less than 450 $m^2/g$, with the highly dispersible precipitated silicas being preferred.

In the present invention, the BET specific surface area is determined in known manner, in accordance with the method of Brunauer, Emmett and Teller described in "The Journal of the American Chemical Society", vol. 60, page 309, February 1938, which corresponds to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner, such as by electron or optical microscopy on thin sections. Non-limiting examples of preferred highly dispersible silicas include the silicas Zeosil 1165 MP and 1115 MP from Rhodia.

"Silica" is also intended to mean mixtures of different silicas, in particular, of highly dispersible silicas such as those above.

Non-highly dispersible silicas may also be used, such as the silica Ultrasil VN3 from Degussa.

Suitable carbon blacks include the blacks of grade 3, such as N339, N347, N375, and blacks of grade 5, 6 or 7. The mass fraction of carbon black present in the reinforcing filler may vary preferably from 40% to 60% and the mass fraction of silica preferably from 60 to 40%. Moreover, the carbon black may be present in the rubber composition in an amount ranging from 10 to 30 phr.

In accordance with the invention, a cross-linkable, expandable blank for an elastomeric safety support having a cellular structure comprising closed cells is formed from at least one diene elastomer and water, wherein the diene elastomer has a molar ratio of diene units of less than 15%, and the water is present in the elastomer in a quantity of from 3 phr to 6 phr.

Further, the cross-linkable, expandable blank comprises a reinforcing filler that is a blend of silica and carbon black, the silica being present in the blank in an amount of from 10 to 30 phr.

Preferably, the diene elastomer of the cross-linkable expandable blank is a copolymer formed from isobutylene and a co-monomer selected from isoprene or paramethylstyrene.

A cross-linked, expanded elastomeric safety support according to the invention which comprises at least one diene elastomer having a molar ratio of diene units of less than 15%, preferably the isobutylene/isoprene or isobutylene/paramethylstyrene copolymer, and a reinforcing filler is produced by the above-recited process. In accordance with the invention, the reinforcing filler comprises silica in an amount of from 10 to 30 phr.

The cross-linked expanded support also comprises a blowing agent, such as azobisformamide, in an amount quantity greater than 2 phr, preferably in an amount greater than 5 phr. This relatively high amount of blowing agent which is still present in the cross-linked, expanded support makes it possible to have a higher reinflation potential when traveling at zero tire pressure, which results in travel effected at a higher pressure within the tire.

The invention thus provides a process for reducing the internal heating of a safety support having a cellular structure comprising closed cells, which is mounted on a wheel rim within a tire in order to ensure tire function of the tire following a drop in pressure, comprising mounting on the wheel rim a cross-linked, expanded support obtained by the process according to the invention.

The aforementioned characteristics of the present invention, as well as others, will be better understood on reading the following examples which are given by way of illustration and not of limitation.

EXAMPLE 1

Manufacture of a Support According to the Invention and a "Control" Support

Two safety supports having a cellular structure comprising closed cells (cellular supports) were manufactured which can be used in the cross-linked, expanded state for fitting in motorcycle tires. One support was a "control" support and the other a support according to the invention.

Each of these two supports were prepared from the same elastomeric matrix formed of a copolymer of isoprene and isobutylene, [had] a toric geometry characterized by a diameter of 120 mm and the same density which was substantially equal to 0.1.

The supports are intended to be used within a mounted assembly of dimensions 140/90-18 (in which the width of the tire is 140 mm, the spacing between the rim seats is 90 mm and the diameter of the rim measured at the location of a rim seat is 18 inches).

Each support was manufactured via a process of thermomechanical working as described. In the first step, each of the rubber compositions, comprising the elastomeric matrix, a blowing agent and a vulcanization system, which constitute the supports was kneaded in an internal mixer. The kneading step was characterized by a dropping temperature of about 120° C.

The rubber composition intended to constitute a support according to the invention contained water, whereas the "control" composition did not.

Moreover, the rubber composition according to the invention contained a blend of silica and carbon black as reinforcing filler, whereas the "control" composition contained a reinforcing filler which is formed only of carbon black.

The quantities used for introducing the various constituents into the mixer, in order to obtain these two cross-linkable compositions, are set forth in Table I below.

TABLE I (phr: parts by weight per hundred parts of elastomer).

| Constituents introduced into the mixer | Quantities (phr) of cross-linkable "control" composition | Quantities (phr) of cross-linkable "invention" composition |
|---|---|---|
| Carbon black N683 | 40 | 20 |
| Hydrated silica | — | 22.5 |
| Aromatic oil | 10 | 10 |
| ZnO | 4.5 | 4 |
| Stearic acid | 3.5 | — |
| Anti-ozone wax | 3 | 3 |
| Antioxidant | 2 | — |
| Vulcanization system: | | |
| sulphur | 1.8 | 1.8 |
| tetramethylthiuram disuiphide | 1.4 | 1.4 |
| mercaptobenzothiazole | 0.5 | 0.5 |
| Blowing agent: | | |
| azobisformamide "GENITRON AC" | 13 | 26 |

The hydrated silica that was used in the composition according to the invention has a mass fraction of water which is substantially equal to 18%. Thus, the hydrated silica contributed water to the composition according to the invention in an amount substantially equal to 4 phr. The hydrated silica possessed the specific BET and CTAB surface area characteristics which are those of the silica "Zeosil 1165 MP".

Finally, the cross-linkable expandable composition which is intended to constitute the support according to the invention contained twice as much blowing agent as the "control" composition.

In the second step of the manufacturing process, the rubber composition obtained at the end of the kneading step was extruded to obtain a cross-linkable, expandable support blank of predetermined section which, in its cross-linked, expanded state, is suitable for equipping motorcycle tires having the aforementioned dimensions. The extrusion temperature was less than or equal to 100° C.

The third step of the process involved preliminary curing of the support blank obtained at the end of the second step in a mold. Then, the pre-cured blank was expanded by thermal decomposition of the blowing agent and vulcanized in a turntable-type oven, in order to obtain a cross-linked, expanded support. The vulcanization temperature was between 140° C. and 160° C.

As noted above, the water content of the cross-linkable, expandable blank according to the invention was substantially 4 phr, whereas the water content of the blank constituting the "control" support was substantially equal to 0.5 phr. The water in the "control" blank essentially comes from molecules of water linked to the carbon black as well as from ambient humidity which is absorbed by the rubber composition.

The presence of silica in the reinforcing filler for the blank according to the invention prevents decomposition of the blowing agent during preliminary curing, thus permitting demolding which does not render the pre-cured blank fragile. It was confirmed that the blank according to the invention was devoid of tears on its periphery at the location of the joint planes of the preliminary curing following its demolding.

EXAMPLE 2

Comparison of the Properties of the Support According to the Invention and the "Control" Support The respective densities of the cross-linked, expanded support according to the invention and the "control" support manufactured as set forth in Example 1 were compared.

Table II summarizes the average densities obtained for each of the supports, as well as their densities at the core and at the periphery. For each support having a 60 mm radius, "core of the support" refers to a solid toric volume, the section of which is concentric to that of said support and has a radius of 50 mm. "Periphery of the support" refers to a hollow toric volume representing the remaining volume of the support, the section of which being a ring of radial width equal to 10 mm.

TABLE II

| | Average density | Core density | Peripheral density |
|---|---|---|---|
| "Control" support | 0.095 | 0.062 | 0.130 |
| Support according to the invention | 0.095 | 0.044 | 0.165 |

These results show that the density gradient between the periphery and the core of the support is higher for the support according to the invention than for the "control" support. In fact, this density gradient, which is due to the strongly exothermic decomposition of the blowing agent upon the expansion, is even more increased with the use of a higher amount of blowing agent in the initial thermomechanical kneading step.

In this example, it should be noted that, during expansion, the core and peripheral temperatures of the blanks reach 190° C. and 150° C., respectively. The azobisformamide which is used as blowing agent in the composition begins to decompose at a temperature of 140° C.

The remaining amount of blowing agent (azobisformamide) in the cross-linked, expanded support according to the invention was assayed. The assay of the blowing agent present in a plurality of sections of the support (toric sectors obtained by radial cutting) was performed by liquid-phase chromatography coupled with the use of an ultraviolet/visible spectrophotometer. The azobisformamide was quantified by the method of external standardization. The extraction conditions and the chromatography conditions used are indicated hereafter.

The azobisformamide was extracted from the rubber composition using a mixture of extraction solvents composed of 50% DMSO (dimethylsulphoxide "Aldrich" of HPLC grade, 99.9% pure) and 40% toluene (analysis-grade toluene "RP Normapur" of the "Prolabo" type, 99.5% pure). The toluene makes it possible to expand the composition of the section of the support, while the DMSO solubilizes the azobisformamide contained in the composition. 1.8 ml of this solvent mixture was used per 30 mg of composition.

The extraction was performed for 6 days on a shaking machine. At the end of the extraction, 0.2 ml methanol (analysis-grade methanol "RP Normapur" type "Prolabo", 99.8% pure) was added in order to re-coagulate the elastomer, so as to not contaminate the chromatography column. The solution obtained was then filtered through a filter of type PTFE/polypropylene "Millex" having a porosity of 0.5 $\mu$m. 1 to 2 ml of the filtrate so obtained was poured into a flask, in order to inject 10 $\mu$l into the chromatography system.

The chromatography conditions used were as follows:

Chromatography column: sold under the name "Lichrosphere" (length 25 cm, internal diameter 4.0 mm) stationary phase: "diol" grafted silica, with a particle diameter of 5 $\mu$m Eluent: Mixture of 90% ethyl acetate "Aldrich" of HPLC grade (99.8% pure), and 10% cyclohexane "Carlo Erba" (minimum 99.8% pure).

Flow rate: 1 ml/min.

Injection volume: 10 $\mu$l.

Detector: UV spectrophotometer with diode array, "Waters 996", with scanning of the wavelengths $\lambda$ between 200 and 400 nm (detection wavelength $\lambda_{max}$ of azobisformamide=254 nm).

solvent for dissolving: For the standardization, the azobisformamide was dissolved in a DMSO/toluene/methanol mixture, in proportions of 50/40/10 (%)

Using this assay method, several distinct sections of the support according to the invention were analyzed, each having been compacted and homogenized. This analysis established an average amount of azobisformamide of 5.9 phr in the cross-linked, expanded support according to the invention, while the "control" support, in the cross-linked, expanded state, contained a substantially smaller quantity of blowing agent.

Microscopic analysis of the two supports obtained furthermore showed that the peripheral cells of the support according to the invention have a shape approximately that of an oblong polyhedron. The peripheral cells of the "control" support, have a more regular polyhedron (substantially the shape of a dodecahedron) shape.

The variation in volume of the support according to the invention and that of the "control" support, upon heating of each from an initial temperature of 20° C. to a temperature of at least 100° C., followed by cooling to 20° C., was compared.

The results obtained are shown in the form of indices in Tables III and IV hereafter.

In Table III, V0 designates an index of initial volume relative to a base of 100, for each support at a temperature of 20° C., V1 designates the volume index of each support following heating in an oven from 20° C. to 100° C., and V0' designates the volume index of each support following cooling from 100° C. to 20° C.

An index greater than 100 following heating or cooling indicates expansion of the support while (an index lower than 100 indicates shrinkage of the support).

TABLE III

|  | V0 | V1 | V0' |
| --- | --- | --- | --- |
| "Control" support | 100 | 125 | 94 |
| Support according to the invention | 100 | 148 | 96 |

Table III shows that the support according to the invention dilated to a greater extent than the "control" support following an increase in its internal temperature to a temperature at which water begins to vaporize. Following a return to its initial temperature, the support of the invention returned to a volume which is closer to its initial volume than did the "control" support.

In Table IV, V0 designates the same index of initial volume relative to a base of 100, for each support at a temperature of 20° C., V1' designates the volume index of each support following heating in an oven from 20° C. to 150° C., and V0" designates the volume index of each support following cooling from 150° C. to 20° C.

TABLE IV

|  | V0 | V1' | V0" |
| --- | --- | --- | --- |
| "Control" support | 100 | 137 | 89 |
| Support according to the invention | 100 | 210 | 142 |

Table IV shows that the support according to the invention dilated much more than the "control" support following an increase in its internal temperature to 150° C. Moreover, the support of the invention acquired a volume which was greater by 42% than its initial volume following a return to its initial temperature, contrary to the "control" support, which actually shrunk.

This increase in volume of the support according to the invention was confirmed when traveling at zero pressure and under severe conditions, when it was fitted on a motorcycle mounted assembly. In fact, it was determined that the volume of this support, following its removal from the mounted assembly after traveling at zero pressure, increased by 65% relative to the initial volume of the support before this travel, which was even greater than that measured following the oven treatment at 150° C.

Tables III and IV show that, because of the pressure of a relatively high amount of blowing agent, the support according to the invention has a higher re-expansion potential when traveling at zero pressure than the "control" support. This re-expansion potential results in travel that is carried out at a higher pressure within the tire.

The internal heating when traveling at zero pressure of the support according to the invention was compared to that of the "control" support.

Mounted assemblies which were provided with the support according to the invention and with the "control" support, respectively, were run on a smooth-drum roller having a one meter diameter. The evolution of the internal temperature of each support was monitored by "stabbing" into the core of the support through the tire of each mounted assembly using a 2 mm diameter probe.

For each support, the mounted assembly having the dimensions as in Example 1 was used.

The conditions of load on the mounted assembly and of speed of travel were selected such they corresponded to the conditions of cross-country rally-type competitions. More precisely, the load Z to which each mounted assembly was subjected was 210 kg, which corresponds to a conventional load bearing on the rear wheel of a cross-country rally motorcycle. The speed of travel was maintained at 150 km/h.

The initial equivalent pressure within the tire was 1.1 bar.

It will be noted that the absence of shock which characterizes this travel has practically no influence on this temperature change.

FIG. 1 is a graph that shows the change in the internal temperature of each support during such travel at zero air pressure. The graph shows that the internal temperature of the support according to the invention stabilizes at a temperature of approximately 150° C., substantially starting from 20 minutes' travel at zero air pressure, whereas the internal temperature of the "control" support continues to increase after this traveling time, exceeding 200° C. after 40 minutes.

It will be noted that the support according to the invention can provide tire function for the tire for several hours, when traveling at zero pressure, without exhibiting deterioration and without damaging said tire.

I claim:

1. A process for manufacturing a cross-linked, expanded elastomeric safety support having a cellular structure comprising closed cells, said support being capable of being mounted on a wheel rim within a tire, said process comprising kneading by thermomechanical working a rubber composition comprising a diene elastomer having a molar ratio of diene units of less than 15%, water in an amount of from 3 to 6 phr, a blowing agent that provides for formation of the cellular structure and a vulcanization system, forming the rubber composition after thermomechanical working into a cross-linkable expandable support blank, curing the blank in a mold followed by demolding the cured blank, and expanding by decomposing the blowing agent and vulcanizing the cured blank so as to obtain a cross-linked expanded support.

2. A process for manufacturing a cross-linked expanded elastomeric safety support having a cellular structure comprising closed cells, said support being capable of being mounted on a wheel rim within a tire, said process comprising kneading by thermomechanical working a rubber composition comprising a diene elastomer having a molar ratio of diene units of less than 15%, water in an amount of from 3 to 6 phr, a reinforcing filler comprising silica in an amount of from 10 to 30 phr and carbon black, a blowing agent that provides for formation of the cellular structure and a vulcanization system, forming the rubber composition after thermomechanical working into a cross-linkable expandable support blank, curing the blank in a mold followed by demolding the cured blank, and expanding by decomposing the b owing agent and vulcanizing the cured blank so as to obtain a cross-linked expanded support.

3. The process of claim 1 or 2 wherein the diene elastomer is a copolymer of isobutylene and a co-monomer selected from between isoprene and parmethyistyrene.

4. The process of claim 1 or 2 wherein the rubber composition initially comprises the blowing agent in amount of from 15 to 30 phr.

5. The process of claim 1 or 2 wherein the blowing agent is azobisformamide.

6. A process for manufacturing a cross-linked expanded elastomeric safety support having a cellular structure comprising closed cells, said support being capable of being mounted on a wheel rim within tire, the process comprising kneading by thermomechanical working a rubber composition comprising a copolymer of isobutylene and isoprene, water in an amount of from 3 to 6 phr, a reinforcing filler comprising silica in an amount of from 10 to 30 phr and carbon black in an amount of from 10 to 30 phr, azobisformamide in an amount of from 15 to 30 phr and a vulcanization system, forming the rubber composition after thermomechanical working into a cross-linkable expandable support blank of predetermined section, curing the blank in a mold followed by demolding the cured blank, and expanding by decomposing the azobisformamide and vulcanizing the cured blank so as to obtain a cross-linked expanded support.

7. A process for reducing internal heating during travel of an elastomeric safety support having a cellular structure comprising closed cells that is mounted on a wheel rim within a tire to ensure tire function following a drop in pressure comprising mounting on the wheel rim a safety support manufactured by the process of any of claims 1, 2 or 6.

* * * * *